(No Model.)

C. W. DOBELIN.
LANTERN.

No. 501,877. Patented July 18, 1893.

WITNESSES:
N. A. Burmister
J. E. Wakeley

Charles W Dobelin INVENTOR

BY
C. J. Wakeley
his ATTORNEY.

UNITED STATES PATENT OFFICE.

CHARLES W. DOBELIN, OF MADISON, WISCONSIN.

LANTERN.

SPECIFICATION forming part of Letters Patent No. 501,877, dated July 18, 1893.

Application filed February 7, 1893. Serial No. 461,343. (No model.)

*To all whom it may concern:*

Be it known that I, CHARLES W. DOBELIN, a citizen of the United States, residing at Madison, in the county of Dane, State of Wisconsin, have invented a new and useful Lantern, of which the following is a specification.

My invention relates to improvements in lanterns and the object of my improvements is to so construct the extreme end bearing part of the base of the lantern that the lantern will be prevented from moving and slipping from the position in which it is placed especially when placed on a moving car rendered slippery by ice, snow, frost or rain. I attain these objects by the mechanism illustrated in the accompanying drawings in which—

Figure 1:
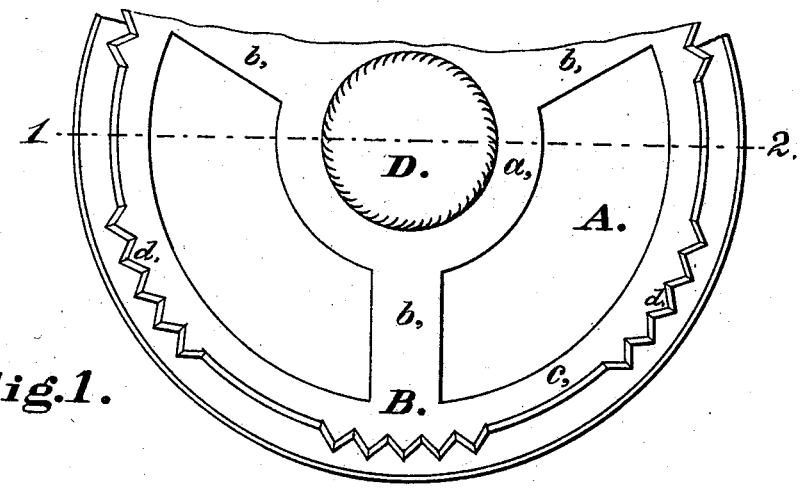
Figure 2:
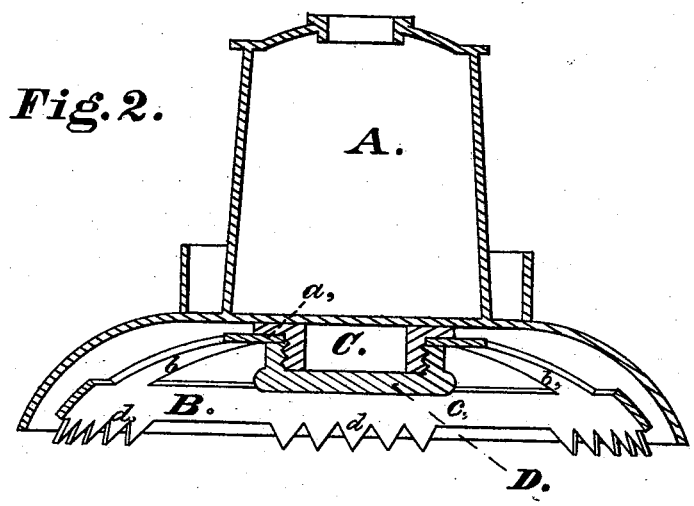

Figure 1. is a bottom view of the lantern with my device in place; and Fig. 2. is a vertical section of the same on the line 1. 2. Fig. 1.

Similar letters refer to similar parts throughout both views.

My improvements consist of devices attached to the bottom surface of an ordinary railway lantern A. such bottom being in the form of a disk concave on the lower surface. Upon the central portion of the lower surface of the lantern I fasten by soldering a ferrule or pipe standard C. flanged around the upper end and projecting downward some distance less than the outside rim of the lantern. Upon the outer surface of such ferrule standard I cut a screw thread extending from the lower end to the flange and I fit thereon the nut D. which is capped over its downward end and milled around the cap. A wheel like creeper B. is formed of metal plate consisting of a perforated hub, elastic spokes and an outer pointed rim. The perforated hub $a$. is put in place over the standard C. which it over reaches a distance around its periphery. Such hub will be supported and clamped centrally beneath the bottom of the lantern by the nut D. which presses the hub against the flange of the standard C. The hub $a$. supports the three elastic arms or spokes $b\,b\,b$. which latter extend laterally near and along the under surface of the lantern—bent to correspond with the oval shape of the lantern— to near its outward rim where such arms or spokes are attached to and support a rim $c$. The rim $c$ extends diagonally downward and outward continuing inside the course of the lantern bottom and has at intervals six parts or portions of its extreme lower edge extending a little distance below the other portions of the rim $c$. and also a little distance below the rim or original resting part of the lantern. Such extreme downward parts of my rim $c$. have their edges cut, pressed or otherwise formed into teeth, notches or corrugations $d$. $d$. which teeth &c., will be pointed downwardly. The rim $c$. with points $d\,d$. may be of rubber or metal. This construction of my device will admit of the permanent soldering of the screw ferrule standard C. upon the bottom surface of the lantern and the placing over the standard and around its base of the hub $a$. bearing the arms or spokes $b\,b\,b$ and the toothed rim $c$. and the screwing on of the nut C. which will fasten and clamp such hub with the spokes and outer rim in their proper places. The lantern will then be prepared for use and may be so used during the winter months or wet stormy or windy seasons of the year. The rim $c$. being within the outer rim of the lantern its teeth will be prevented from catching the clothing of the bearer when carried. The teeth will strike the surface of the car or other object upon which the lantern is placed and will prevent the slipping of the lantern while the brakeman who uses it is setting or loosening the brakes; or while the hands of any workman using it are engaged; or when the lantern is at any time placed out of hand. The bearing of the lantern on my creeper or device will be central giving the same great purchase at its points or teeth, the elasticity of the spokes also helping the adhesion. At seasons of the year when my improvement is not required to be in use the cap nut will be unscrewed and the inner rim or hub with its supported spokes and outer rim will be removed and the cap nut will again be screwed upon the standard protecting the latter from injury.

What I claim as my invention, and desire to secure by Letters Patent, is—

1. In combination with a lantern, a flanged screw bolt attached to the lantern, a centrally perforated metal plate having notched bearings below the base of the lantern, and a nut clamping the plate to the flange, substantially as and for the purpose set forth.

2. In combination with a lantern a flanged screw ferrule upon its base, a nut upon the ferrule, a hub perforated by the ferrule and clamped by the nut, an outer rim supporting the lantern, downwardly projecting notches formed in the base of the rim, and elastic spokes intermediate of the hub and rim, substantially as set forth.

CHARLES W. DOBELIN.

Witnesses:
CHAS. E. BUELL,
J. E. WAKELEY.